(12) United States Patent
Pal

(10) Patent No.: US 7,863,785 B2
(45) Date of Patent: Jan. 4, 2011

(54) HIGH POWER-DENSITY STATIC-FIELD AC CONDUCTION MOTOR

(76) Inventor: Anadish Kumar Pal, 194 Vaishali, Pitampura, Delhi, Delhi (IN) 110088

( * ) Notice: Subject to any disclaimer, the term of this patent is extended or adjusted under 35 U.S.C. 154(b) by 338 days.

(21) Appl. No.: 12/183,276

(22) Filed: Jul. 31, 2008

(65) Prior Publication Data

US 2009/0039824 A1  Feb. 12, 2009

(30) Foreign Application Priority Data

Aug. 8, 2007 (IN) .................. 1681/DEL/2007

(51) Int. Cl.
*H02K 11/00* (2006.01)
(52) U.S. Cl. .............. 310/68 R; 310/68 D; 310/176
(58) Field of Classification Search .............. 310/68 R, 310/68 D, 162, 176, 45, 36
See application file for complete search history.

(56) References Cited

U.S. PATENT DOCUMENTS

| | | | | |
|---|---|---|---|---|
| 4,459,505 A | * | 7/1984 | Lim | 310/318 |
| 4,636,999 A | * | 1/1987 | Lygas | 367/156 |
| 4,642,581 A | * | 2/1987 | Erickson | 331/154 |
| 4,749,897 A | * | 6/1988 | Natsume et al. | 310/317 |
| 4,808,891 A | * | 2/1989 | Watanuki et al. | 315/411 |
| 4,818,916 A | * | 4/1989 | Morrisroe | 315/111.21 |
| 4,896,063 A | * | 1/1990 | Roberts | 310/68 R |
| 4,947,312 A | * | 8/1990 | Tsuruoka et al. | 363/134 |
| 5,418,446 A | * | 5/1995 | Hallidy | 322/28 |
| 5,637,973 A | * | 6/1997 | Hirai et al. | 318/640 |

\* cited by examiner

*Primary Examiner*—Thanh Lam

(57) ABSTRACT

An ac motor for high-torque drive has a transformer with a magnetic circuit with a central limb. Either the two ends or the two connected electrodes of the secondary winding of the transformer project at an angle to the longitudinal axis of the secondary winding; an armature rotor dielectrically bridges the two ends or the two connected electrodes, moving parallel to the longitudinal axis. The rotor forms two series-connected capacitors with the two ends or the two connected electrodes. An LC circuit is formed by the two capacitors in series to the total effective inductance of the power source, the electric transformer, the two ends or the connected electrodes and the armature. The impedance of the LC circuit is varied by the frequency of the power source supplying the primary winding of the transformer, in order to push required electric power from the power source to the series LC circuit.

12 Claims, 5 Drawing Sheets

HIGH POWER-DENSITY STATIC-FIELD AC CONDUCTION MOTOR

CROSS-REFERENCE TO RELATED APPLICATIONS

Foreign application priority claimed from Indian Patent Application No. 1681/DEL/2007 of Aug. 8, 2007 entitled, 'High power density static-field ac conduction motor,' the contents of which are incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Present invention, directed to the field of electromagnetic rotatory motors, employs an ac power source and a tangential twin-row bristle stator and a nonmagnetic rotor having an armature receiving ac from the stator through capacitive conduction, with wide torque capability.

In case of a rotatory ac electric motor, the air gap between the stator and the rotor results in significant weakening of effective magnetic flux density in the magnetic circuit of the motor, resulting in high magnetizing currents and limited peak torque. Further, due to the frequency-pole-rpm relationship in the motor, peak torque cannot increase without increasing either the stack length or the stack diameter of the motor, which results in an increased motor weight. Extremely high power-to-weight ratios are needed to implement electric propulsion in electrical vehicles and aviation.

All of the existing electrically powered motion-giving technologies employ a rotatory or linear moving electromagnetic field. Especially, the linear movement of the electromagnetic field is either externally induced or self-induced by the linear translatory motion of a current-carrying armature along a linear twin stator. The twin stator is often schematically drawn as parallel rails to ease the theoretical understanding. However, the easy visualization as rails has impeded the evolution of technology in the present field, as many designers began concept making from a vivid visualization of parallel rails carrying a current-carrying armature and busied themselves with solving ancillary problems. Problems associated with long parallel rails were partially solved with segmental and chevron-shaped nested segmental rails; the employment of chevron-shaped nested segmental rails as inductive storage means was a step towards reducing rail-lengthwise voltage drops; but it also meant supplying very high peak currents pulses to the inductive storage means. However, either a contact-less and tribo-efficient or arcless and smooth current-delivery method to the current carrying armature can solve many existing problems together with the development of a high-power density ac electric motor, as discussed in the preceding paragraph. At present, a device popularly called ball bearing motor finds limited interest by some enthusiasts. Ball bearing motor has very little practical value, as it only demonstrates a unique and controversially understood mechanism for an alternative electric motor. However, in spite of the various claims to the special nature of the ball bearing motor, it is a rotary variant of so-called EM railgun with all the associated problems, such as, arcing and excessive heating.

BRIEF SUMMARY OF THE INVENTION

With reference to the above-presented background and requirements, an ac electric motor of the present invention has in its first version, an electric transformer with a magnetic circuit having a central limb; the two ends of at least one unit-turn or fractional turn secondary winding of the transformer, projecting at an angle which is not normal to the longitudinal axis of the secondary winding; the primary winding of the electric transformer encircled by the unit-turn or fractional turn secondary winding; the two ends substantially coplanar and symmetrically disposed on the two sides of an imaginary median along the longitudinal axis; at least one armature means dielectrically bridging the two ends, confined to be moveable parallel to the longitudinal axis and physically in between the two ends, either the armature means or the two ends or both having dielectric means to electrically insulate the armature means from the two ends; the dielectric means having unity or more than unity electrical permittivity; two series-connected capacitors formed by the electrical permittivity of the dielectric means between the armature means and the two ends; the electric transformer having a primary winding connected with connection means to an alternating current electric power source; an estimation means for the resonant frequency of a series LC circuit comprising the two series-connected capacitors in series to the total effective inductance of the effective inductance respectively of the alternating current power source, the connection means, the electric transformer, the two ends and the armature means; the fundamental frequency of the alternating current power source is referenced to the resonant frequency to supply required electric power from the alternating current power source to the series LC circuit; the electrically conductive parts of the primary winding and the secondary winding of the electric transformer are either made of good conductors or superconductors; and the electrically conductive parts of the armature means too are either made of a good conductor or a superconductor.

An embodiment of the first version of the present invention has the longitudinal axis of the secondary winding is circular and is parallel to a plurality of the two ends of the secondary winding, to form the channel with a uniform section, running parallel to the longitudinal axis; the two ends of at least one unit-turn or fractional turn secondary winding of the transformer, projecting either centripetally or centrifugally secant-wise to the circular component of the cross section of the secondary winding at the angle which is not normal to the longitudinal axis of the secondary winding; the uniform section uniformly enclosed inside or beside the secondary winding; and the angle is an acute angle and points as an imaginary half arrowhead either, when the two ends projecting centripetally, to the direction of circular motion by the armature means under the influence of electromagnetic forces produced with a large induced alternating current from the electric power flowing through the armature means, causing a substantial consumption of the electric power or, when the two ends projecting centrifugally, against the direction of circular motion by the armature means under the influence of electromagnetic forces produced with a large induced alternating current from the electric power flowing through the armature means, causing a substantial consumption of the electric power.

Another addition to the first embodiment of the first version of the present invention has the plurality of unit-turn or fractional turn secondary windings placed in resistive separation, side by side, forming a bonded toroidal stack along the longitudinal axis; the bonded toroidal stack is integrated with the secondary winding, forming an electromagnetic flux concentrator; and the electromagnetic flux concentrator is either permanently fixed to the electric transformer or is replaceable in service.

A further addition to the above described embodiments of the present invention has the plurality of secondary windings longitudinally enclosed externally by a toroidal magnetic circuit having a magnetic permeability of unity of more than unity.

Second version of the present invention has at least one electric transformer with a magnetic circuit having a central limb; the two ends of a unit-turn or fractional turn secondary winding of the transformer, respectively joined electrically to two electrodes projecting at an angle which is not normal to the longitudinal axis of the secondary winding; the primary winding of the electric transformer encircled by the unit-turn or fractional turn secondary winding; the two electrodes substantially coplanar and symmetrically disposed on the two sides of an imaginary median along the longitudinal axis; at least one armature means dielectrically bridging the two electrodes, confined to be moveable parallel to the longitudinal axis and physically in between the two electrodes; either the armature means, the two electrodes or both having dielectric means to electrically insulate the armature means from the two electrodes; the dielectric means having unity or more than unity electrical permittivity; two series-connected capacitors formed by the electrical permittivity of the dielectric means between the armature means and the two electrodes; the electric transformer having a primary winding connected with connection means to an alternating current electric power source; an estimation means for the resonant frequency of a series LC circuit comprising the two series-connected capacitors in series to the total effective inductance of the effective inductance respectively of the alternating current power source, the connection means, the electric transformer, the two electrodes and the armature means; the fundamental frequency of the alternating current power source is referenced to the resonant frequency to supply required electric power from the alternating current power source to the series LC circuit; the electrically conductive parts of the primary winding and the secondary winding of the electric transformer are either made of good conductors or superconductors; and the electrically conductive parts of the armature means too are either made of a good conductor or a superconductor.

An embodiment of the second version of the present invention has the longitudinal axis of the secondary winding circular and parallel to a plurality of the two electrodes, to form the channel with a uniform section, running longitudinally parallel to the longitudinal axis; the two electrodes, projecting either centripetally or centrifugally secant-wise to the circular component of the cross section of the secondary winding at the angle which is not normal to the longitudinal axis of the secondary winding; the uniform section uniformly enclosed inside the secondary winding; and the angle is an acute angle and points as an imaginary half arrowhead either, when the two electrodes projecting centripetally, to the direction of circular motion by the armature means under the influence of electromagnetic forces produced with a large induced alternating current from the electric power flowing through the armature means, causing a substantial consumption of the electric power or, when the two electrodes projecting centrifugally, against the direction of circular motion by the armature means under the influence of electromagnetic forces produced with a large induced alternating current from the electric power flowing through the armature means, causing a substantial consumption of the electric power.

An addition to the above-described embodiment has the plurality of two electrodes placed in resistive separation, side by side, forming a bonded toroidal stack along the longitudinal axis; the bonded toroidal stack is either permanently fixed to the electric transformer or is replaceable in service; the bonded toroidal stack is integrated with the secondary winding, forming an electromagnetic flux concentrator; and the electromagnetic flux concentrator is either permanently fixed to the electric transformer or is replaceable in service.

A further addition to all the embodiments of the second version of the present invention has the secondary winding longitudinally enclosed externally by a toroidal magnetic circuit having a magnetic permeability of unity of more than unity.

Third version of the present invention has at least one electric transformer with a magnetic circuit having a central limb; the two ends of a unit-turn or fractional turn secondary winding of the transformer, respectively joined electrically to two electrodes projecting at an angle which is not normal to the longitudinal axis of the secondary winding; the primary winding of the electric transformer encircled by the unit-turn or fractional turn secondary winding; the two electrodes substantially coplanar and symmetrically disposed on the two sides of an imaginary median along the longitudinal axis; at least one armature means contactlessly bridging the two electrodes, confined to be moveable parallel to the longitudinal axis and physically in between the two electrodes; dielectric fluid means to electrically insulate the armature means from the two electrodes; the dielectric means having unity or more than unity electrical permittivity; two series-connected capacitors formed by the electrical permittivity of the dielectric means between the armature means and the two electrodes; the electric transformer having a primary winding connected with connection means to an alternating current electric power source; a series LC circuit comprising the two series-connected capacitors in series to the total effective inductance of the effective inductance respectively of the alternating current power source, the connection means, the electric transformer, the two electrodes and the armature means; the fundamental frequency of the alternating current power source resulting in an impedance in the series LC circuit to supply required electric power from the alternating current power source to the series LC circuit; the electrically conductive parts of the primary winding and the secondary winding of the electric transformer are either made of good conductors or superconductors; and the electrically conductive parts of the armature means too are either made of a good conductor or a superconductor.

The present invention in all its forms can also be understood as at least one electric transformer with a magnetic circuit having a central limb; two ends of at least one unit-turn or fractional turn secondary winding of the transformer, the primary winding of the electric transformer encircled by the unit-turn or fractional turn secondary winding, the two ends substantially coplanar and symmetrically disposed on the two sides of an imaginary median along the longitudinal axis, at least one armature means dielectrically bridging the two ends, confined to be moveable parallel to the longitudinal axis and physically flanked by the two ends, substantially as herein described with reference to the drawings to be presented in the next section.

BRIEF DESCRIPTION OF THE SEVERAL VIEWS OF THE DRAWINGS

Accompanying drawings on five drawing sheets are seven in number. Numerals with backslash are employed to identify features and components of the drawings. Numeral indicia to the left of backslash \ denote figure number; numeral indicia to the right hand side of backslash \ identify a feature. Identical right hand side numerals denote functional and/or positional similarity throughout the several views.

DETAILED DESCRIPTION OF THE INVENTION

Figure 1:
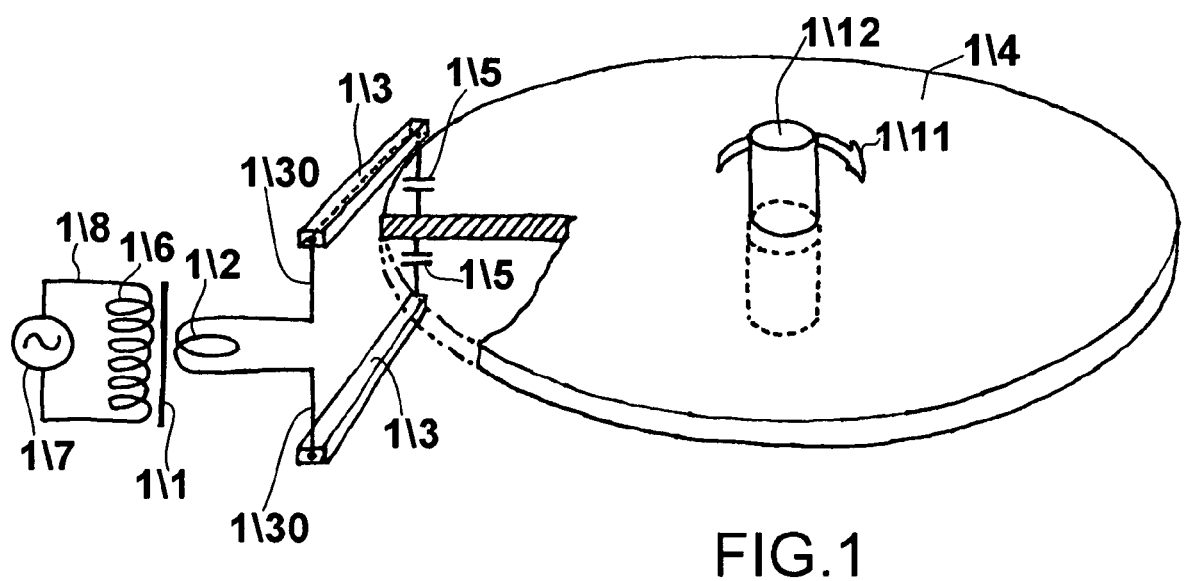
FIG. 1 is a schematic showing the basic conceptual construction and the electrical circuit of the present invention.

An ac electric motor of the present invention has in its first version, an electric transformer with magnetic circuit 1\1 having a central limb. The central limb and magnetic circuit 1\1 could be common, if magnetic circuit 1\1 is toroidal as shown in FIG. 2 by magnetic circuit 2\1. Alternatively, if magnetic circuit 1\1 is linear, armature means 1\4 would not be in the form of a circular disc, rather, it would a linear or rectangular armature means big enough to stably bridge the gap between two ends 1\3 to form two series-connected capacitors 1\5 (depicted schematically in FIG. 1 as standard circuit elements only to aid understanding); such a device would work as a linear motion-giving actuator or motor, with a possibility of armature means detachable and intended for one-time use. Two ends 1\3 of unit-turn or fractional turn secondary winding 1\2 of the transformer, projecting at an angle [FIG. 1] which is not normal to the longitudinal axis of secondary winding 1\2; primary winding 1\6 of the electric transformer encircled by unit-turn or fractional turn secondary winding 1\2 or 2\2; two ends 1\3 substantially coplanar and symmetrically disposed on the two sides of an imaginary median [visualized by the disc formed by armature means 1\4 in FIG. 1] along the longitudinal axis; armature means 1\4 dielectrically bridging two ends 1\3, confined to be moveable parallel to the longitudinal axis and physically in between two ends 1\3, either armature means 1\4 or two ends 1\3 or both having dielectric means [in the form of air, vacuum or a fluid] to electrically insulate armature means 1\4 from two ends 1\3; the dielectric means having unity or more than unity electrical permittivity; two series-connected capacitors 1\5 formed by the electrical permittivity of the dielectric means between armature means 1\4 and two ends 1\3; the electric transformer having primary winding 1\6 connected with connection means 1\8 to alternating current electric power source 1\7; an estimation means for the resonant frequency of a series LC circuit comprising two series-connected capacitors 1\5 in series to the total effective inductance of the effective inductance respectively of alternating current power source 1\7, connection means 1\8, the electric transformer, two ends 1\3 and armature means 1\4; the fundamental frequency of alternating current power source 1\7 is referenced to the resonant frequency to supply required electric power from alternating current power source 1\7 to the series LC circuit; the electrically conductive parts of primary winding 1\6 and secondary winding 1\2 of the electric transformer are either made of good conductors or superconductors; and the electrically conductive parts of armature means 1\4 too are either made of a good conductor or a superconductor. Armature means 1\4 (in FIG. 1) are shown as having a smooth circular periphery; however, the periphery could be uniformly serrated or dentated with either gear teeth, square teeth or saw teeth for higher peak torque generation. If the dielectric means are in the form of a fluid, then frictional heating has to be minimized, in order to insure reliable functioning of the electric motor.

Instead of rotor shaft 1\12 fixed to a bearing or rotor shaft 2\12 fixed to bearing 2\14 with the help of bearing ring 2\13 (made of a dielectric or a bad conductor), two series-connected capacitors 1\5 [although, not shown explicitly in FIG. 2, but present in the gap shown between armature means 2\4 and two ends 2\3].

An embodiment of the first version of the present invention has the longitudinal axis of the secondary winding 2\2 circular and is parallel to a plurality of two ends 2\3 of secondary winding 2\2, to form a channel with a uniform section, running parallel to the longitudinal axis; two ends 1\3, 4\3, 5\3 of unit-turn or fractional turn secondary winding 1\2, 4\2, 5\2, projecting either centripetally or centrifugally secant-wise to the circular component of the cross section of secondary winding 2\2, 4\2, 5\2 at the angle which is not normal to the longitudinal axis of secondary winding 2\2, 4\2, 5\2; the uniform section uniformly enclosed inside or beside secondary winding 2\2, 4\2, 5\2; and the angle is an acute angle and points as an imaginary half arrowhead either, when two ends 1\3 projecting centripetally, to direction of circular motion 1\11 by armature means 1\4 under the influence of electromagnetic forces produced with a large induced alternating current from the electric power flowing through armature means 1\4, causing a substantial consumption of the electric power or, when two ends 5\3 or 7\3 projecting centrifugally, against the direction of circular motion by armature means 5\4 or 7\4 under the influence of electromagnetic forces produced with a large induced alternating current from the electric power flowing through armature means 5\4 or 7\4, causing a substantial consumption of the electric power.

Another addition to the first embodiment of the first version of the present invention has a plurality of unit-turn or fractional turn secondary windings 1\2 or 2\2 placed in resistive separation, side by side, forming a bonded toroidal stack along the longitudinal axis. The bonded toroidal stack forming an electromagnetic flux concentrator; and the electromagnetic flux concentrator is either permanently fixed to the electric transformer or is replaceable in service. Various configurations of electromagnetic flux concentrators are defined in the preceding section and described with the help of figures.

A further addition to the above-described embodiments of the present invention has the plurality of secondary windings 1\2 or 2\2 longitudinally enclosed externally by a toroidal magnetic circuit having a magnetic permeability of unity of more than unity. This external toroidal magnetic circuit will fully enclose the plurality of secondary windings 2\2, save from the region of internal flux concentrator. Therefore, the external toroidal magnetic circuit will reach to the centre up to ball bearing retaining ring 2\13 which is made of a dielectric material or of a bad conductor metal. The external toroidal magnetic circuit is not shown in the drawings.

Second version of the present invention is to be understood with a slight change of context with reference to two ends 1\3 and secondary winding 1\2 as described in the preceding text. Now on, two ends 1\3 have to be taken as two electrodes 1\3, while two shortened ends are denoted by 1\30. Therefore, now onwards, two shortened ends 1\30 or 2\30 (or so on) are joined to two respective electrodes 1\3 or 2\3 (or so on). This version of the present invention, otherwise, is fully identical in concept to the earlier described version, except for a new constructional feature, wherein, secondary winding 1\2 remains unitary, while there could be a plurality of the sets of two electrodes 1\3 or 2\3 (or so on); and a joining takes place at two shortened ends 1\30 or 2\30 (or so on) of secondary winding 1\2 and a possible plurality of the sets of two electrodes 1\3 or 2\3 (or so on). The whole of the proceeding description is to be uniformly understood with reference to the above mentioned change of context. So, the second version of the present invention has at least one electric transformer with magnetic circuit 1\1 having a central limb; two shortened ends 1\30 of unit-turn or fractional turn secondary winding 1\2 of the transformer, respectively joined electrically to two electrodes 1\3 projecting at an angle [FIG. 1] which is not normal to the longitudinal axis of secondary winding 1\2; primary winding 1\8 of the electric transformer encircled by unit-turn or fractional turn secondary winding 1\2 or 2\2; two electrodes 1\3 substantially coplanar and symmetrically disposed on the two sides of an imaginary median [visualized by the disc formed by armature means 1\4 along the longitudinal axis; armature means 1\4 dielectrically bridging two electrodes 1\3, confined to be moveable parallel to the longitudinal axis and physically in between two electrodes 1\3; either armature means 1\4, two electrodes 1\3 or both having dielectric means [in the form of air, vacuum or a fluid] to electrically insulate armature means 1\4 from two electrodes 1\3; the dielectric means having unity or more than unity electrical permittivity; two series-connected capacitors formed by the electrical permittivity of the dielectric means between armature means 1\4 and two electrodes 1\3; the electric transformer having primary winding 1\6 connected with connection means 1\8 to alternating current electric power source 1\7; an estimation means for the resonant frequency of a series LC circuit comprising the two series-connected capacitors in series to the total effective inductance of the effective inductance respectively of alternating current power source 1\7, the connection means 1\8, the electric transformer, two electrodes 1\3 and armature means 1\4; the fundamental frequency of alternating current power source 1\7 is referenced to the resonant frequency to supply required electric power from alternating current power source 1\7 to the series LC circuit; the electrically conductive parts of primary winding 1\6 and secondary winding 1\2 of the electric transformer are either made of good conductors or superconductors; and the electrically conductive parts of armature means 1\4 too are either made of a good conductor or a superconductor.

Figure 4:
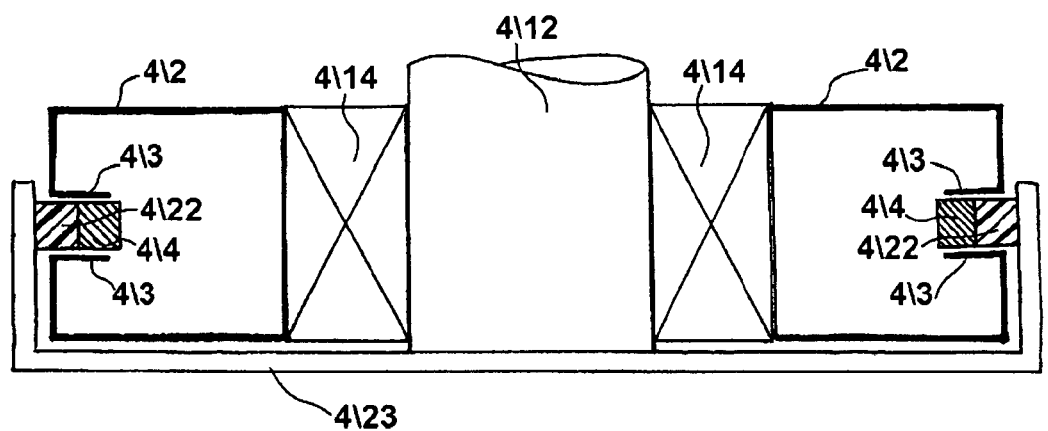
FIG. 4 is a schematic operational depiction of a version of the present invention, with external rotor and external inward flux concentrator.
Figure 5:
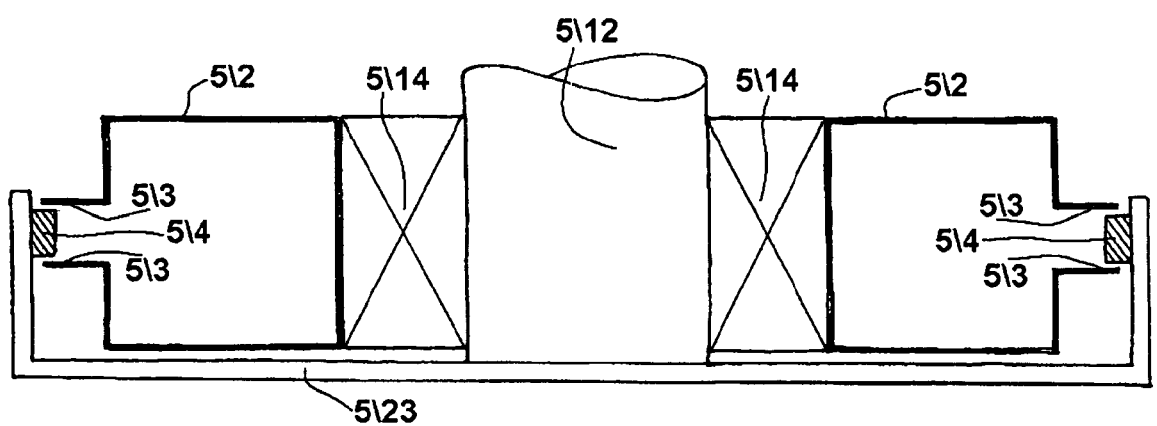
FIG. 5 is a schematic operational depiction of a version of the present invention, with external rotor and external outward flux concentrator.
Figure 6:
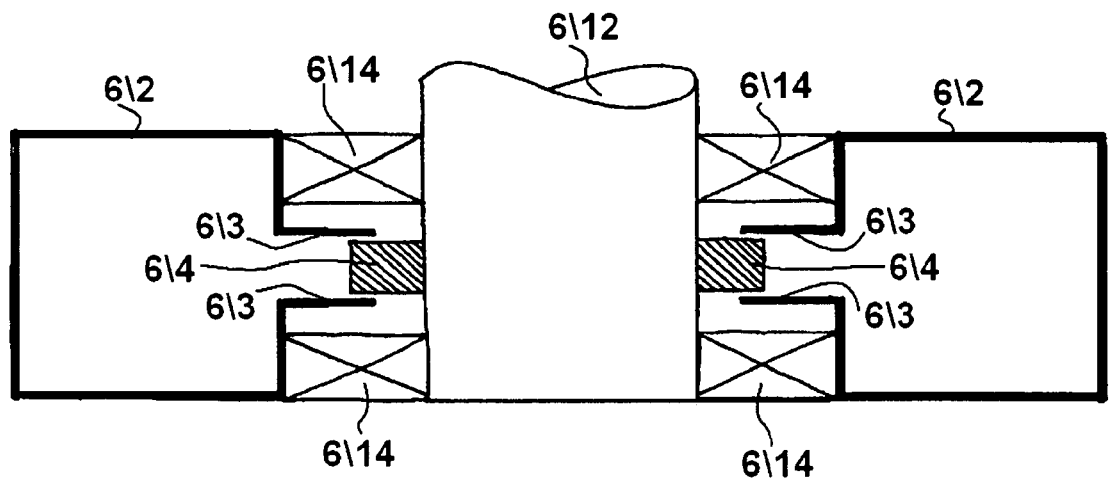
FIG. 6 is a schematic operational depiction of the version of the present invention shown in FIG. 2, with internal rotor and internal inward flux concentrator.
Figure 7:
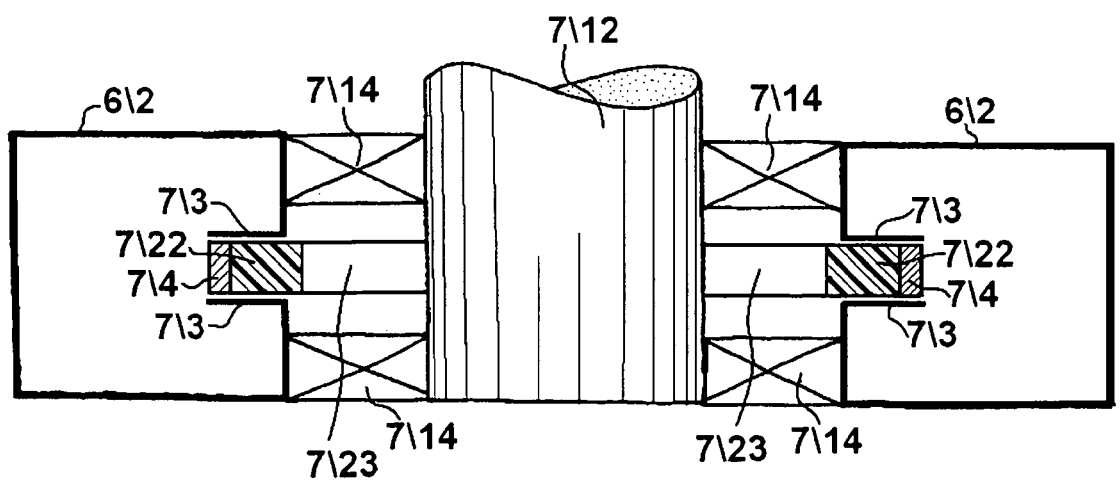
FIG. 7 is a schematic operational depiction of a version of the present invention, with internal rotor and internal inward flux concentrator.

An embodiment of the second version of the present invention has the longitudinal axis of secondary winding 2\2 circular and parallel to a plurality of two electrodes 2\3, to form a channel with a uniform section, running longitudinally parallel to the longitudinal axis; two electrodes 1\3, 4\3, 5\3 projecting either centripetally or centrifugally secant-wise to the circular component of the cross section of secondary winding 2\2, 4\2, 5\2 at the angle which is not normal to the longitudinal axis of secondary winding 2\2, 4\2, 5\2; the uniform section uniformly enclosed inside secondary winding 2\2, 4\2, 5\2; and the angle is an acute angle and points as an imaginary half arrowhead either, when two electrodes 1\3 projecting centripetally, to direction of circular motion 1\11 by armature means 1\4 under the influence of electromagnetic forces produced with a large induced alternating current from the electric power flowing through armature means 1\4, causing a substantial consumption of the electric power or, when two electrodes 5\3 or 7\3 projecting centrifugally, against the direction of circular motion by armature means 5\4 or 7\4 under the influence of electromagnetic forces produced with a large induced alternating current from the electric power flowing through armature means 5\4 or 7\4, causing a substantial consumption of the electric power. The link between armature means 4\4, 5\4, 7\4 and rotor shaft 4\12, 5\12, 7\12 is armature holder flywheel 4\23, 5\23, 7\23 which holds armature means 4\4, 5\4, 7\4, because in some cases it is not necessary to construct the whole of armature structure with the same material as armature means 4\4, 5\4, 7\4. Armature holder flywheel 4\23, 5\23, 7\23 can be either of metallic, thermoplastic or composite in construction. However, in FIG. 4 (external inward flux concentrator) and in FIG. 7 (internal inward flux concentrator), in order to produce electromagnetic forces necessary for the operation of these two versions of the present invention, armature insulator ring 4\22, 7\22 is needed, which is ideally made of a dielectric material, but could also be of a material which exhibits low electrical conductivity.

An addition to the above-described embodiment has the plurality of two electrodes 1\3 or 2\3 (and so on) placed in resistive separation, side by side, forming a bonded toroidal stack along the longitudinal axis. The bonded toroidal stack is either permanently fixed to the electric transformer or is replaceable in service. Also, in an additional feature, the bonded toroidal stack is integrated with secondary winding 1\2 or 2\2, forming an electromagnetic flux concentrator; and the electromagnetic flux concentrator is either permanently fixed to the electric transformer or is replaceable in service.

A further addition to all the embodiments of the second version of the present invention has the secondary winding 1\2 or 2\2 (or so on) longitudinally enclosed externally by a toroidal magnetic circuit having a magnetic permeability of unity of more than unity. This external toroidal magnetic circuit will fully enclose the plurality of secondary windings 2\2, save from the region of internal flux concentrator. Therefore, the external toroidal magnetic circuit will reach to the centre up to ball bearing retaining ring 2\13 which is made of a dielectric material or of a bad conductor metal. The external toroidal magnetic circuit is not shown in the drawings.

Figure 2:
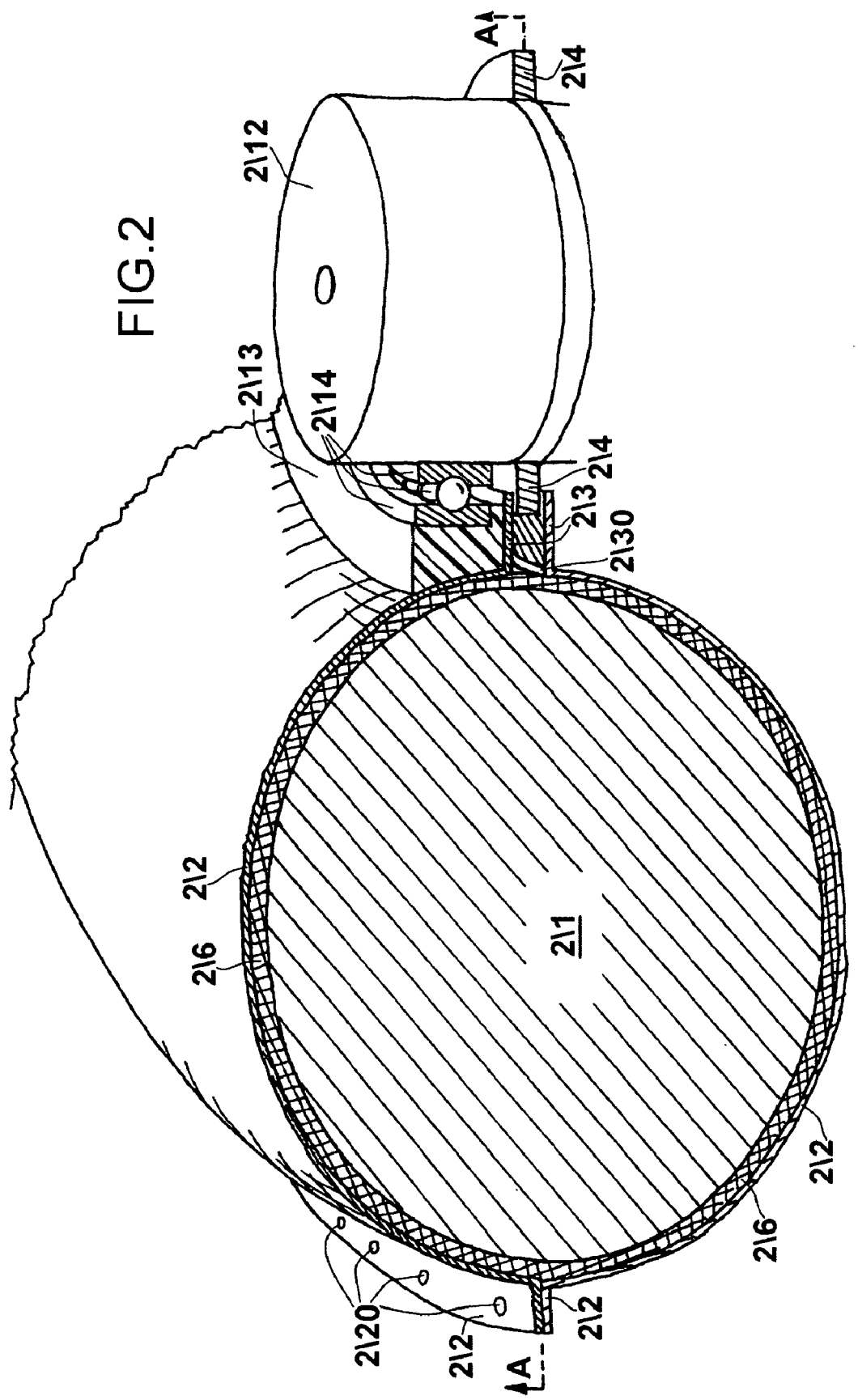
FIG. 2 is a partial cutaway view of a form of the present invention, with internal rotor and internal inward flux concentrator.
Figure 3:
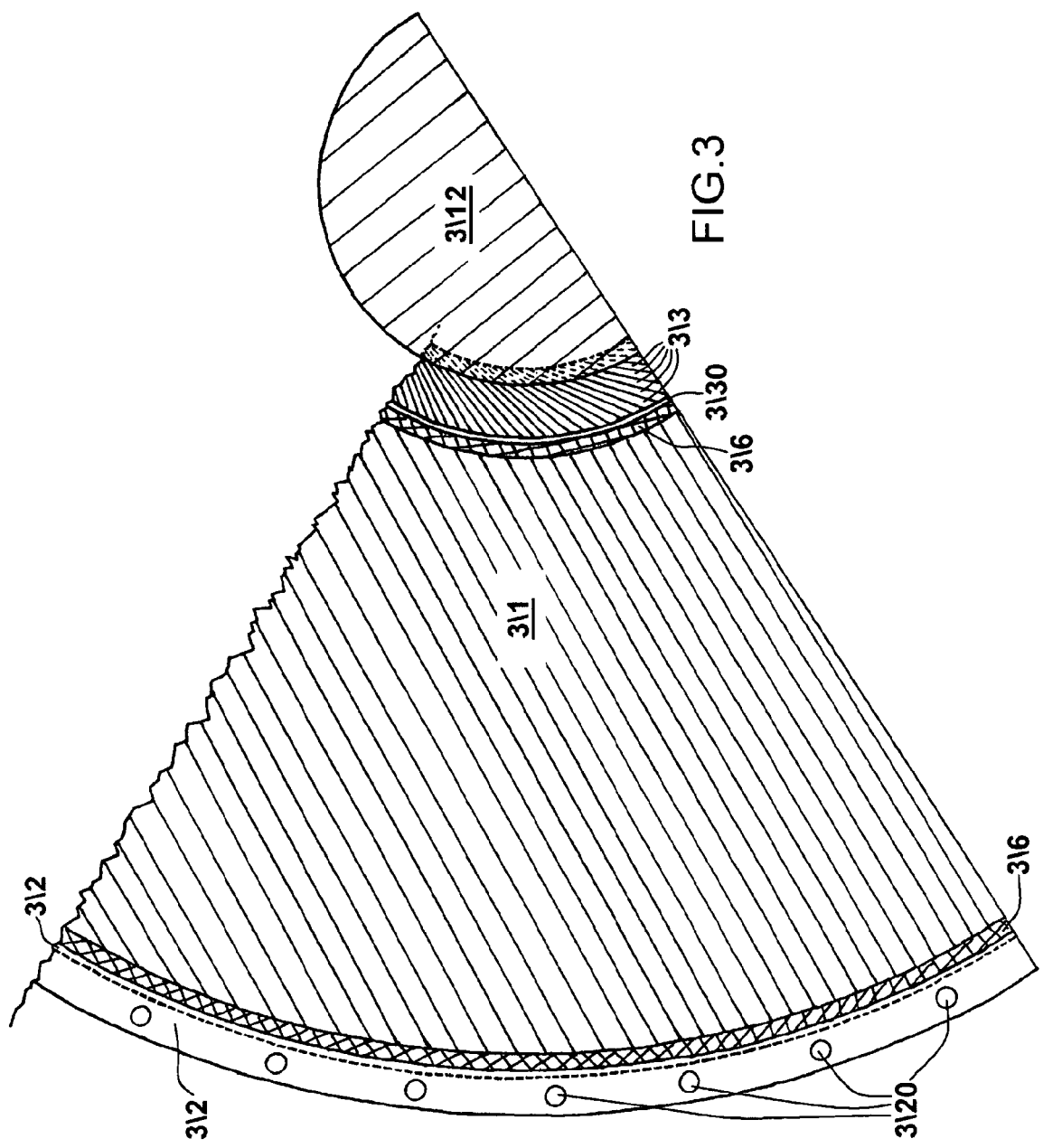
FIG. 3 is a cross section through line A-A in FIG. 2.

Third version of the present invention has at least one electric transformer with magnetic circuit 1\1 having a central limb; two shortened ends 1\30 of unit-turn or fractional turn secondary winding 1\2 of the transformer, respectively joined electrically to two electrodes 1\3 projecting at an angle [FIG. 1] which is not normal to the longitudinal axis of secondary winding 1\2; primary winding 1\8 of the electric transformer encircled by unit-turn or fractional turn secondary winding 1\2 or 2\2; two electrodes 1\3 substantially coplanar and symmetrically disposed on the two sides of an imaginary median [visualized by the disc formed by armature means 1\4 in FIG. 1] along the longitudinal axis; armature means 1\4 contactlessly bridging two electrodes 1\3, confined to be moveable parallel to the longitudinal axis and physically in between two electrodes 1\3; dielectric fluid means to electrically insulate armature means 1\4 from two electrodes 1\3; the dielectric fluid means having unity or more than unity electrical permittivity; two series-connected capacitors formed by the electrical permittivity of the dielectric fluid means between armature means 1\4 and two electrodes 1\3; the electric transformer having primary winding 1\6 connected with connection means 1\8 to alternating current electric power source 1\7; a series LC circuit comprising the two series-connected capacitors in series to the total effective inductance of the effective inductance respectively of alternating current power source 1\7, connection means 1\8, the electric transformer, two electrodes 1\3 and armature means 1\4; the fundamental frequency of alternating current power source 1\7 resulting in an impedance in the series LC circuit to supply required electric power from alternating current power source 1\7 to the series LC circuit; the electrically conductive parts of primary winding 1\6 and secondary winding 1\2 of the electric transformer are either made of good conductors or superconductors; and the electrically conductive parts of armature means 1\4 too are either made of a good conductor or a superconductor.

I claim:

1. An ac electric motor comprising:
   at least one electric transformer with a magnetic circuit having a central limb;
   the two ends of at least one unit-turn or fractional turn secondary winding of said transformer, projecting at an angle which is not normal to the longitudinal axis of said secondary winding;
   the primary winding of said electric transformer encircled by said unit-turn or fractional turn secondary winding;
   said two ends substantially coplanar and symmetrically disposed on the two sides of an imaginary median along said longitudinal axis;
   at least one armature means dielectrically bridging said two ends, confined to be moveable parallel to said longitudinal axis and physically in between said two ends, either said armature means or said two ends or both having dielectric means to electrically insulate said armature means from said two ends;
   said dielectric means having unity or more than unity electrical permittivity;
   two series-connected capacitors formed by said electrical permittivity of said dielectric means between said armature means and said two ends;
   said electric transformer having a primary winding connected with connection means to an alternating current electric power source;
   an estimation means for the resonant frequency of a series LC circuit comprising said two series-connected capacitors in series to the total effective inductance of the effective inductance respectively of said alternating current power source, said connection means, said electric transformer, said two ends and said armature means;
   the fundamental frequency of said alternating current power source is referenced to said resonant frequency to supply required electric power from said alternating current power source to said series LC circuit;
   the electrically conductive parts of said primary winding and said secondary winding of said electric transformer are either made of good conductors or superconductors; and
   the electrically conductive parts of said armature means too are either made of a good conductor or a superconductor.

2. An ac electric motor in accordance with claim 1, wherein the longitudinal axis of said secondary winding is circular and is parallel to a plurality of said two ends of said secondary winding,
   to form said channel with a uniform section, running parallel to said longitudinal axis;
   said two ends of at least one unit-turn or fractional turn secondary winding of said transformer, projecting either centripetally or centrifugally secant-wise to the circular component of the cross section of said secondary winding at said angle which is not normal to said longitudinal axis of said secondary winding;
   said uniform section uniformly enclosed inside or besides said secondary winding; and
   said angle is an acute angle and points as an imaginary half arrowhead either,
   when said two ends projecting centripetally, to the direction of circular motion by said armature means under the influence of electromagnetic forces produced with a large induced alternating current from said electric power flowing through said armature means, causing a substantial consumption of said electric power
   or, when said two ends projecting centrifugally, against the direction of circular motion by said armature means under the influence of electromagnetic forces produced with a large induced alternating current from said electric power flowing through said armature means, causing a substantial consumption of said electric power.

3. An ac electric motor in accordance with claim 2, wherein said plurality of unit-turn or fractional turn secondary windings are placed in resistive separation, side by side, forming a bonded toroidal stack along said longitudinal axis;
   said bonded toroidal stack is integrated with said secondary winding, forming an electromagnetic flux concentrator; and
   said electromagnetic flux concentrator is either permanently fixed to said electric transformer or is replaceable in service.

4. An ac electric motor in accordance with claim 2, wherein said plurality of secondary windings are longitudinally enclosed externally by a toroidal magnetic circuit having a magnetic permeability of unity of more than unity.

5. An ac electric motor in accordance with claim 3, wherein said plurality of secondary windings are longitudinally enclosed externally by a toroidal magnetic circuit having a magnetic permeability of unity of more than unity.

6. An ac electric motor comprising:
   at least one electric transformer with a magnetic circuit having a central limb;
   the two ends of a unit-turn or fractional turn secondary winding of said transformer, respectively joined electrically to two electrodes projecting at an angle which is not normal to the longitudinal axis of said secondary winding;
   the primary winding of said electric transformer encircled by said unit-turn or fractional turn secondary winding;
   said two electrodes substantially coplanar and symmetrically disposed on the two sides of an imaginary median along said longitudinal axis;
   at least one armature means dielectrically bridging said two electrodes, confined to be moveable parallel to said longitudinal axis and physically in between said two electrodes;
   either said armature means, said two electrodes or both having dielectric means to electrically insulate said armature means from said two electrodes;
   said dielectric means having unity or more than unity electrical permittivity;
   two series-connected capacitors formed by said electrical permittivity of said dielectric means between said armature means and said two electrodes;
   said electric transformer having a primary winding connected with connection means to an alternating current electric power source;
   an estimation means for the resonant frequency of a series LC circuit comprising said two series-connected capacitors in series to the total effective inductance of the effective inductance respectively of said alternating current power source, said connection means, said electric transformer, said two electrodes and said armature means;

the fundamental frequency of said alternating current power source is referenced to said resonant frequency to supply required electric power from said alternating current power source to said series LC circuit;

the electrically conductive parts of said primary winding and said secondary winding of said electric transformer are either made of good conductors or superconductors; and the electrically conductive parts of said armature means too are either made of a good conductor or a superconductor.

7. An ac electric motor in accordance with claim 6, wherein the longitudinal axis of said secondary winding is circular and is parallel to a plurality of said two electrodes, to form said channel with a uniform section, running longitudinally parallel to said longitudinal axis;

said two electrodes, projecting either centripetally or centrifugally secant-wise to the circular component of the cross section of said secondary winding at said angle which is not normal to said longitudinal axis of said secondary winding;

said uniform section uniformly enclosed inside said secondary winding;

and said angle is an acute angle and points as an imaginary half arrowhead either, when said two electrodes projecting centripetally, to the direction of circular motion by said armature means under the influence of electromagnetic forces produced with a large induced alternating current from said electric power flowing through said armature means, causing a substantial consumption of said electric power or, when said two electrodes projecting centrifugally, against the direction of circular motion by said armature means under the influence of electromagnetic forces produced with a large induced alternating current from said electric power flowing through said armature means, causing a substantial consumption of said electric power.

8. An ac electric motor in accordance with claim 7, wherein said plurality of two electrodes are placed in resistive separation, side by side, forming a bonded toroidal stack along said longitudinal axis;

said bonded toroidal stack is either permanently fixed to said electric transformer or is replaceable in service;

said bonded toroidal stack is integrated with said secondary winding, forming an electromagnetic flux concentrator; and said electromagnetic flux concentrator is either permanently fixed to said electric transformer or is replaceable in service.

9. An ac electric motor in accordance with claim 6, wherein said secondary winding is longitudinally enclosed externally by a toroidal magnetic circuit having a magnetic permeability of unity of more than unity.

10. An ac electric motor in accordance with claim 7, wherein said secondary winding is longitudinally enclosed externally by a toroidal magnetic circuit having a magnetic permeability of unity of more than unity.

11. An ac electric motor in accordance with claim 8, wherein said secondary winding is longitudinally enclosed externally by a toroidal magnetic circuit having a magnetic permeability of unity of more than unity.

12. An ac electric motor comprising:

at least one electric transformer with a magnetic circuit having a central limb;

the two ends of a unit-turn or fractional turn secondary winding of said transformer, respectively joined electrically to two electrodes projecting at an angle which is not normal to the longitudinal axis of said secondary winding;

the primary winding of said electric transformer encircled by said unit-turn or fractional turn secondary winding;

said two electrodes substantially coplanar and symmetrically disposed on the two sides of an imaginary median along said longitudinal axis;

at least one armature means contactlessly bridging said two electrodes, confined to be moveable parallel to said longitudinal axis and physically in between said two electrodes;

dielectric fluid means to electrically insulate said armature means from said two electrodes;

said dielectric means having unity or more than unity electrical permittivity;

two series-connected capacitors formed by said electrical permittivity of said dielectric means between said armature means and said two electrodes;

said electric transformer having a primary winding connected with connection means to an alternating current electric power source;

a series LC circuit comprising said two series-connected capacitors in series to the total effective inductance of the effective inductance respectively of said alternating current power source, said connection means, said electric transformer, said two electrodes and said armature means;

the fundamental frequency of said alternating current power source resulting in an impedance in said series LC circuit to supply required electric power from said alternating current power source to said series LC circuit;

the electrically conductive parts of said primary winding and said secondary winding of said electric transformer are either made of good conductors or superconductors; and the electrically conductive parts of said armature means too are either made of a good conductor or a superconductor.

* * * * *